(12) United States Patent
Wiggins

(10) Patent No.: US 8,368,271 B2
(45) Date of Patent: Feb. 5, 2013

(54) MAGNETICALLY SUSPENDED FLYWHEEL ENERGY STORAGE SYSTEM WITH MAGNETIC DRIVE

(75) Inventor: Daniel C. Wiggins, Edmonds, WA (US)

(73) Assignee: Empire Technology Development LLC, Wilmington, DE (US)

( * ) Notice: Subject to any disclaimer, the term of this patent is extended or adjusted under 35 U.S.C. 154(b) by 556 days.

(21) Appl. No.: 12/637,780

(22) Filed: Dec. 15, 2009

(65) Prior Publication Data

US 2011/0140455 A1    Jun. 16, 2011

(51) Int. Cl.
*H02K 7/09*    (2006.01)
(52) U.S. Cl. ..................... 310/90.5; 310/103
(58) Field of Classification Search .............. 310/74, 310/83, 90.5, 103
See application file for complete search history.

(56) References Cited

U.S. PATENT DOCUMENTS

| | | | |
|---|---|---|---|
| 4,309,620 A | 1/1982 | Bock | |
| 6,054,788 A * | 4/2000 | Dombrovski et al. | 310/103 |
| 6,388,347 B1 | 5/2002 | Blake et al. | |
| 6,727,616 B1 * | 4/2004 | Gabrys et al. | 310/90.5 |
| 6,825,588 B2 | 11/2004 | Gabrys et al. | |
| 6,921,998 B2 | 7/2005 | Giles et al. | |
| 7,508,105 B2 | 3/2009 | Baba | |
| 2003/0141773 A1 * | 7/2003 | Abel | 310/90.5 |
| 2007/0080595 A1 * | 4/2007 | Akiyama et al. | 310/104 |
| 2008/0122308 A1 | 5/2008 | Mleux | |

OTHER PUBLICATIONS

Simon, M. D., et al., "Spin stabilized magnetic levitation," Am J. Physics, Apr. 1997, pp. 286-292, vol. 65, No. 4, American Association of Physics Teachers, USA.
"Earnshaw's Theorem," last modified on Feb. 25, 2012, accessed at http://en.wikipedia.org/wiki/Earnshaw%27s_theorem, 7 pages—dated retrieved Mar. 26, 2012.
"Diamagnetism," last modified on Mar. 23, 2012, accessed at http://en.wikipedia.org/wiki/Diamagnetism, 5 pages—dated retrieved Mar. 26, 2012.
"Electromagnetic Induction," last modified on Mar. 4, 2012, accessed at http://en.wikipedia.org/wiki/Electromagnetic_induction, 3 pages—dated retrieved Mar. 26, 2012.
"The MagnaDrive Adjustable Speed Drive: How does it Work?," Copyright © 2008 MagnaDrive Corporation, accessed at http://www.magnadrive.com/md_asd/how_it_works.shtml, accessed on Mar. 26, 2012, 1 page—dated retrieved Mar. 26, 2012.
International Search Report and Written Opinion for International Application No. PCT/US2010/054379, international filing date of Oct. 28, 2010, mailed on Jan. 26, 2011.
Levitron—The Amazing Anti-Gravity Top, accessed at http://www.levitron.com/physics.html, accessed on Nov. 24, 2009, 2 pages—date retrieved Nov. 24, 2009.

\* cited by examiner

*Primary Examiner* — Nguyen N Hanh
(74) *Attorney, Agent, or Firm* — Hope Baldauff Hartman, LLC

(57) ABSTRACT

Techniques for flywheel energy storage devices including magnetic bearings and/or magnetic drives are generally disclosed. Some example magnetic bearings may include a flywheel magnet and a support magnet arranged to magnetically suspend a rotating flywheel. Some example magnetic drives may include at least one drive magnet arranged to magnetically engage a diamagnetic material associated with the flywheel to exert torque on the flywheel.

13 Claims, 6 Drawing Sheets

MAGNETICALLY SUSPENDED FLYWHEEL ENERGY STORAGE SYSTEM WITH MAGNETIC DRIVE

BACKGROUND

The present disclosure is related to flywheel energy storage devices and, more particularly, to flywheel energy storage devices including magnetic bearings and/or magnetic drives.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
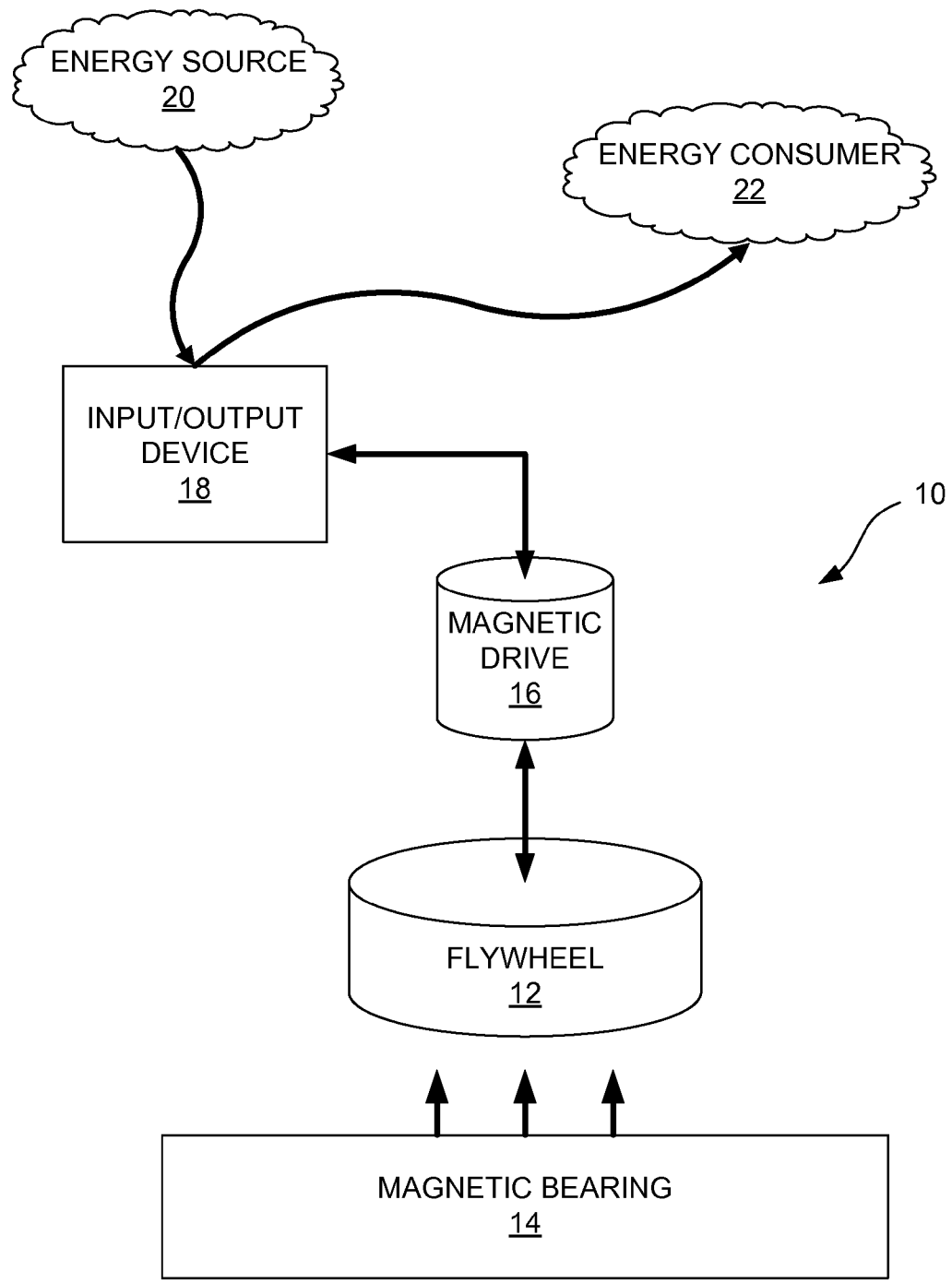
FIG. 1 is a block diagram of an example flywheel energy storage device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, systems, devices, and/or apparatus related to flywheel energy storage and, more particularly, to flywheel energy storage devices including one or more magnetic bearings and/or one or more magnetic drives.

FIG. 1 is a block diagram of an example flywheel energy storage device that is arranged in accordance with at least some embodiments described herein. An example flywheel energy storage (FES) device 10 may include a rotating or rotatable flywheel 12, which may be suspended by a magnetic bearing 14 and/or which may be adapted to store energy as rotational kinetic energy. Energy may be supplied to or withdrawn from flywheel 12 by a magnetic drive 16, which may be operatively coupled to an input/output device 18, such as a motor/generator. Input/output device 18 may be operatively coupled to an energy source 20 (e.g., solar panel, wind turbine, etc.) and/or to an energy consumer 22 (e.g., electric light, computer, etc.).

Some FES devices may be adapted to store energy in the form of rotational kinetic energy by accelerating a flywheel to a high rotational speed. In some FES devices, energy may be extracted from the system by slowing the flywheel and/or converting the flywheel's rotational kinetic energy into another form of energy, such as electrical energy.

Friction between a flywheel and one or more mechanical bearings may cause a FES device to lose energy (e.g., through friction), even when the flywheel is not supplying energy to an energy-consuming application. In some FES devices, an external power source may return the energy lost to friction; however, this may increase the operating cost of the FES device.

The present disclosure contemplates that flywheels supported by magnetic bearings may be adapted for use in FES devices, and that FES devices including magnetic bearings may be more efficient and/or less-costly to operate than FES devices that include mechanical bearings. In particular, employing magnetic bearings instead of mechanical bearings may reduce energy loss due to friction. For example, energy loss in some magnetic bearings may be about 100 times smaller than in some mechanical bearings. Furthermore, because they may not be subject to some mechanical forces, some magnetic bearings may require less maintenance and/or may last longer than some mechanical bearings. Also, some magnetic bearings may allow higher rotational speeds than some mechanical bearings, and higher rotational speeds may increase the energy storage density of some FES devices.

Figure 2:
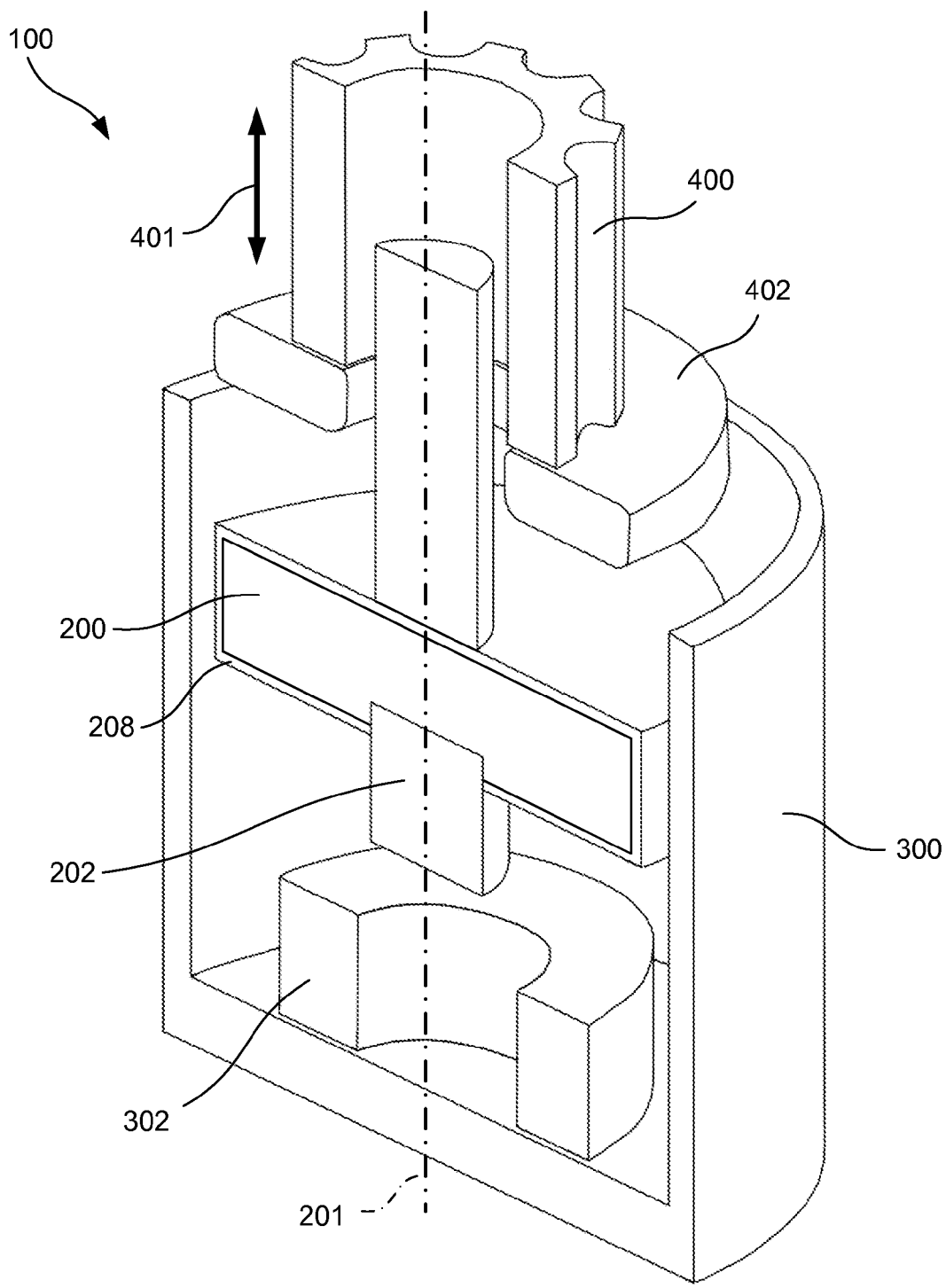
FIG. 2 is cross-sectional perspective view of an example flywheel energy storage device.

FIG. 2 is cross-sectional perspective view of an example flywheel energy storage device that is configured in accordance with at least some embodiments described herein. An example FES 100 according to the present disclosure may include a flywheel subassembly 200, an enclosure subassembly 300, and/or a drive subassembly 400. Flywheel subassembly 200 may be rotatable (e.g., about axis 201) and/or may include a flywheel magnet 202 which may interact with a support magnet 302 of enclosure subassembly 300 to magnetically support flywheel subassembly 200 at least partially within enclosure subassembly 300. Flywheel subassembly 200 may include a jacket 208 which may at least partially encase at least a portion of flywheel subassembly 200.

An example flywheel subassembly 200 may be at least partially constructed from a diamagnetic material (e.g., copper) which may interact with drive magnet 402 of drive subassembly 400 to input and/or withdraw energy to and/or from flywheel subassembly 200, which may store energy in the form of rotational kinetic energy. Drive subassembly 400 may be movable relative to flywheel subassembly 200 generally in the directions indicated by arrow 401, which may be substantially vertical and/or substantially parallel to axis 201.

Figure 3:
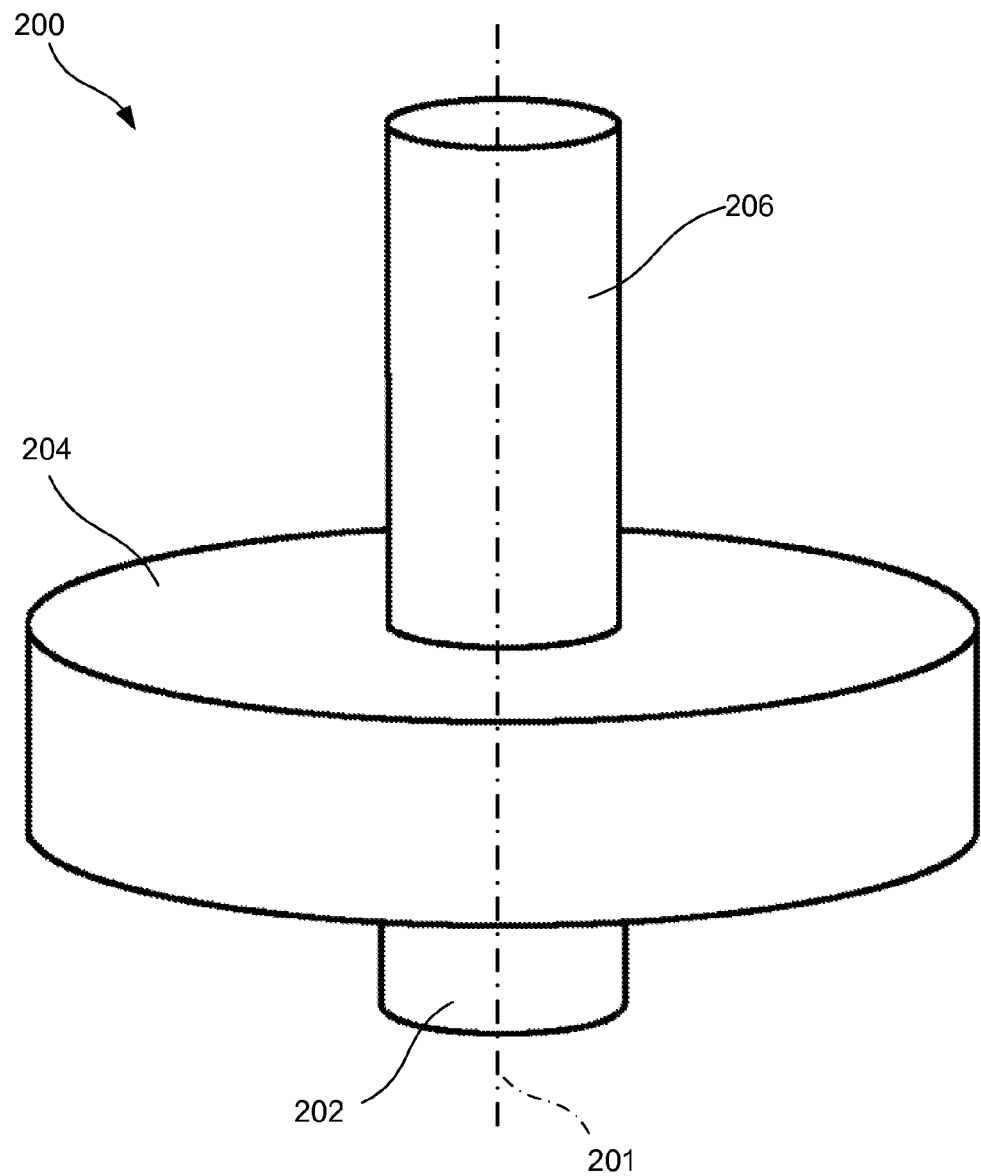
FIG. 3 is a perspective view of an example flywheel subassembly.

FIG. 3 is a perspective view of an example flywheel subassembly that is arranged in accordance with at least some embodiments described herein. As illustrated, example flywheel subassembly 200 may include a generally cylindrical flywheel magnet 202, a disc 204 (which may be generally cylindrical), and/or a generally cylindrical post 206. Flywheel magnet 202, disc 204, and/or post 206 may be arranged substantially coaxially and/or symmetrically about axis 201, about which flywheel subassembly 200 may rotate. Flywheel magnet 202 may include one or more high strength magnets, such as ceramic and/or rare earth (e.g., neodymium and/or samarium-cobalt) magnets, which may be formed into a disc and/or a ring, for example. As illustrated, some example flywheel subassemblies 200 may be constructed such that flywheel magnet 202 lies at least partially beneath disc 204, and/or post 206 may extend generally upward from disc 204. In some example embodiments, jacket 208 may comprise a diamagnetic material and may at least partially encase disc 204.

Figure 4:
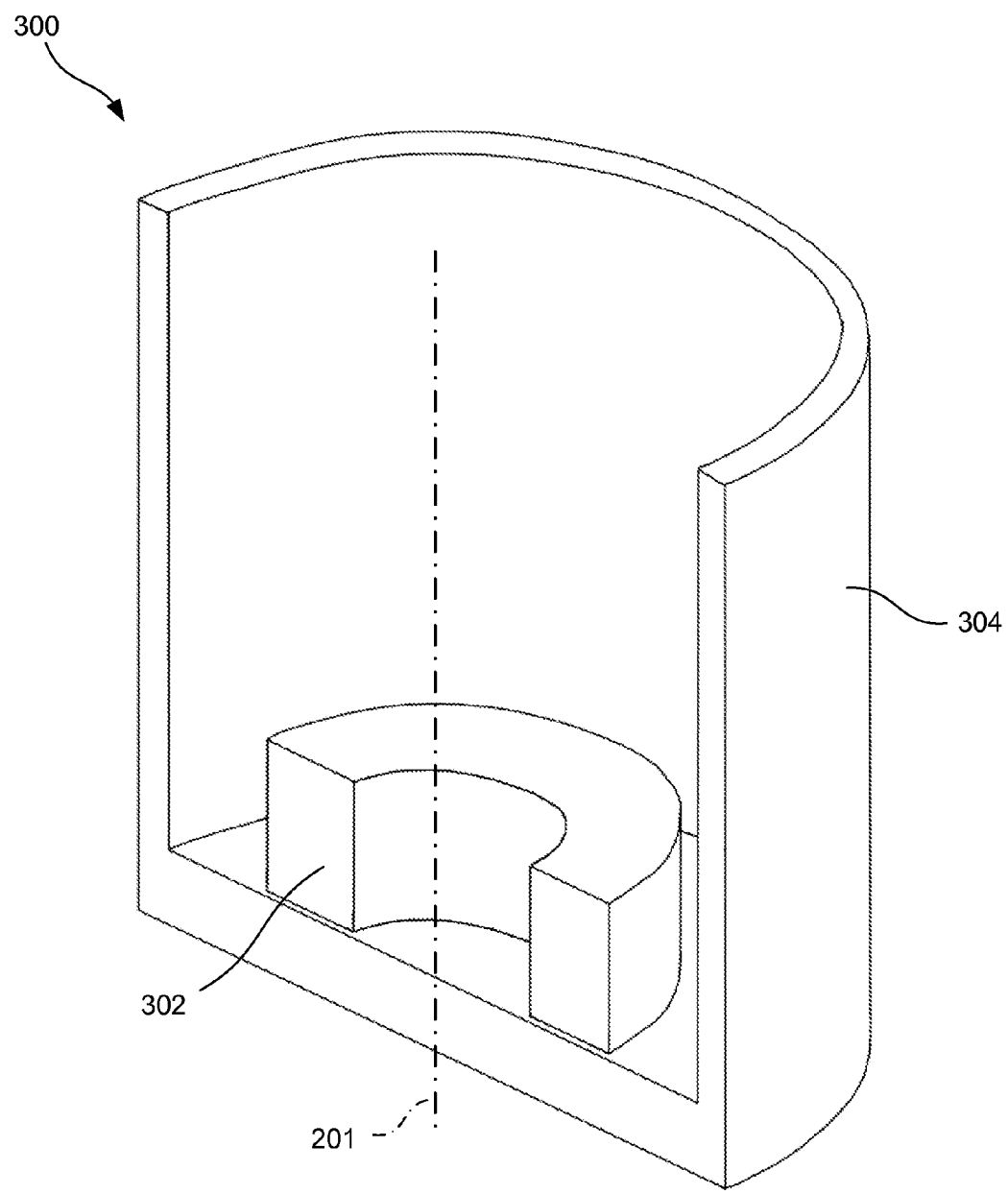
FIG. 4 is cross-sectional perspective view of an example enclosure subassembly.

FIG. 4 is cross-sectional perspective view of an example enclosure subassembly that is arranged in accordance with at least some embodiments described herein. Example enclosure subassembly 300 may include ring and/or donut-shaped support magnet 302 and/or an enclosure body 304, which may be cylindrical and/or substantially hollow. In some example embodiments, support magnet 302 and/or enclosure body 304 may be arranged substantially coaxially and/or symmetrically about axis 201. Enclosure body 304 may receive at least a portion of flywheel subassembly 200 therein. Support magnet 302 may comprise one or more high strength magnets, such as ceramic and/or rare earth (e.g., neodymium and/or samarium-cobalt) magnets, which may be formed into a ring and/or a disc.

In some example embodiments, flywheel magnet 202 and/or support magnet 302 may form a magnetic bearing which may at least partially suspend flywheel subassembly 200. Flywheel magnet 202 and/or support magnet 302 may be oriented such that their respective poles oppose each other. For example, a north pole of the flywheel magnet 202 may be oriented generally downward and/or a north pole of the support magnet 302 may be oriented generally upwards. In some example embodiments, respective south poles of flywheel magnet 202 and/or support magnet 302 may oppose each other. In some example embodiments, flywheel subassembly 200 may be suspended magnetically within enclosure subassembly 300 without the use of mechanical bearings.

In some example embodiments, enclosure body 304 may be constructed at least partially from substantially nonmagnetic materials. For example, enclosure body 304 may be constructed at least partially from KEVLAR® (a light, strong para-aramid synthetic fiber) and/or other non-conductive, non-magnetic material(s). Some example enclosure bodies 304 may be constructed from materials that provide at least some fragmentation protection in the event of a catastrophic failure of flywheel subassembly 200.

Figure 5:
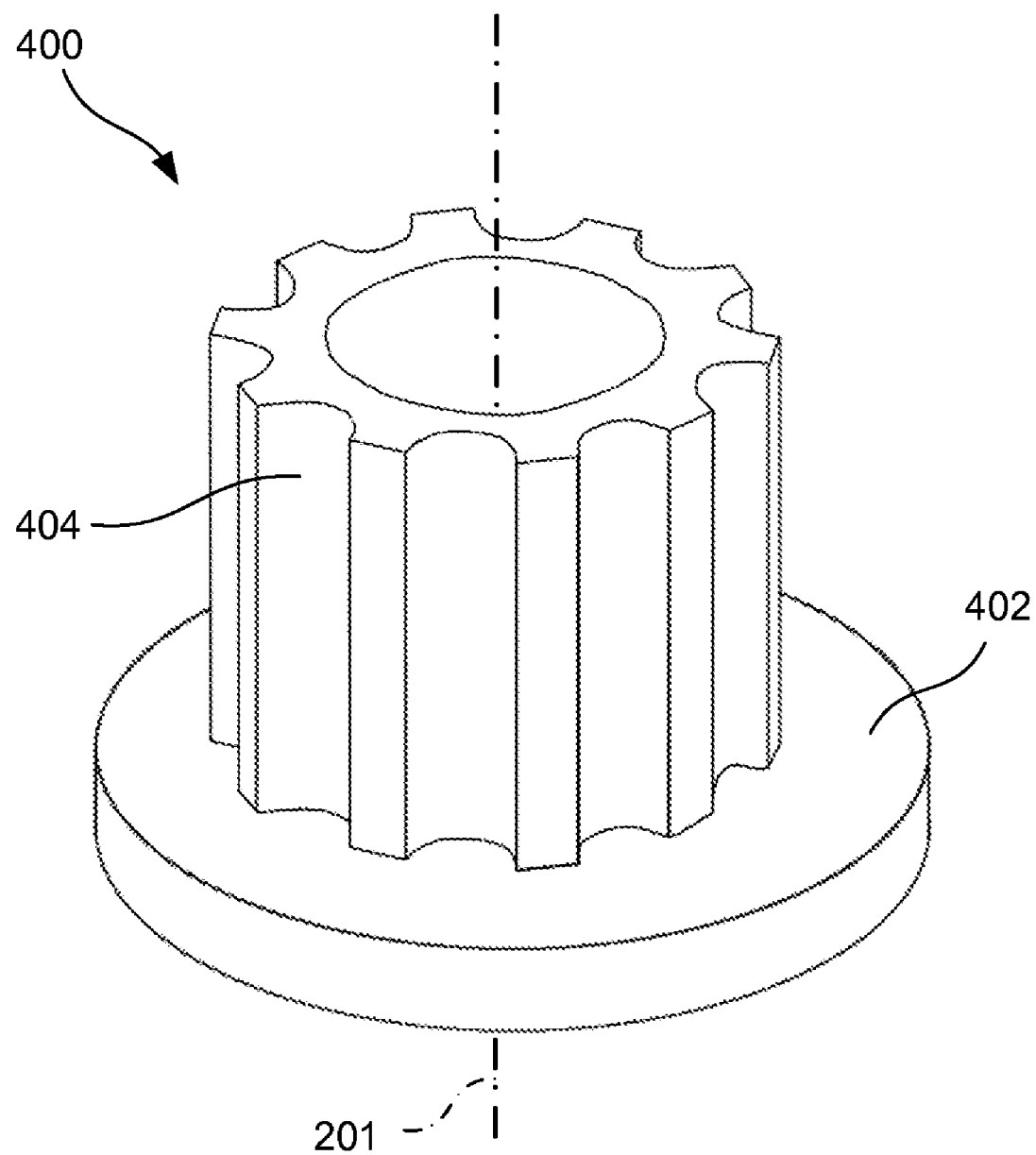
FIG. 5 is a perspective view of an example drive subassembly.

FIG. 5 is a perspective view of an example drive subassembly that is arranged in accordance with at least some embodiments described herein. Example drive subassembly 400 may include a generally annular drive magnet 402 and/or a gear 404 (and/or some other appropriate energy transfer component adapted to interface drive magnet 402 with input/output device 18). In some example embodiments, drive magnet 402 and/or gear 404 may be arranged substantially coaxially and/or symmetrically about axis 201. In some example embodiments, drive magnet 402 and/or gear 404 may be disposed around at least a portion of post 206 of flywheel subassembly 200. Thus, in some example embodiments, flywheel subassembly 200 may be disposed at least partially between support magnet 302 (generally beneath flywheel subassembly 200) and drive magnet 402 (generally above disc 204 of flywheel subassembly 200).

In some example embodiments, drive magnet 402 may include one or more high strength magnets, such as ceramic and/or rare earth (e.g., neodymium and/or samarium-cobalt) magnets, which may be disposed in a generally annular arrangement. Drive magnet 402 may be coupled to gear 404 such that drive magnet 402 and gear 404 rotate as a unit. Gear 404 may be operatively coupled to input/output device 18 to allow transfer of energy from input/output device 18 to and/or from flywheel subassembly 200. More specifically, in some example embodiments, gear 404 may be adapted to engage a gear associated with an input/output device 18 such that rotation of gear 404 may transfer energy to and/or from input/output device 18. For example, gear 404 may be adapted to engage a gear associated with a shaft of a motor/generator, thereby operatively coupling gear 404 and the motor/generator.

In some example embodiments, a magnetic bearing comprising flywheel magnet 202 and/or support magnet 302 may be adapted to stably support flywheel subassembly 200 when flywheel subassembly 200 rotates at various rotational velocities, ω. In some example embodiments, flywheel subassembly 200 may be stably supported while rotating at least over a range of about $\omega_{low}$ to $3*\omega_{low}$. Because the stored energy of a flywheel (e.g., its rotational kinetic energy, $K_{rotation}$) may be proportional to the square of its rotational velocity, a $\omega_{low}$ to $3*\omega_{low}$ range of stable rotational velocities may provide at least a range of $K_{rotation}(\omega_{low})$ to $9*K_{rotation}(\omega_{low})$ of stable energy storage.

In some example embodiments, drive subassembly 400 may be adapted to add and/or remove energy from the flywheel. As mentioned above, in some example embodiments, disc 204 may be at least partially constructed from a diamagnetic material and/or drive magnet 402 may be at least partially constructed from a magnetic material. Some example embodiments may utilize electromagnetic induction to exert forces between drive subassembly 400 (e.g., drive magnet 402) and/or flywheel subassembly 200 (e.g., disc 204). For example, drive magnet 402 may be configured to exert a magnetic force that may be substantially tangential through a diamagnetic material associated with disc 204 and thus may induce a current substantially perpendicular to that force, creating a substantially rotational field. Some example embodiments may include a single-piece drive magnet 402 and/or some example embodiments may include a drive magnet 402 comprising a plurality of magnets, which may be configured to touch one another. In some example embodiments, a drive magnet 402 comprising a plurality of magnets may be less expensive to construct than a single-piece drive magnet 402.

In some example embodiments, drive magnet 402 and/or diamagnetic material associated with disc 204 (e.g., diamagnetic jacket 208) may comprise a magnetic induction drive. In some example embodiments, the position of drive subassembly 400 relative to flywheel subassembly 200 may be adjustable. In particular, drive magnet 402 may be axially lowered to magnetically engage the diamagnetic material of flywheel subassembly 200 (e.g., diamagnetic jacket 208). The degree of magnetic coupling of drive assembly 400 with flywheel subassembly 200 may be adjusted by increasing or decreasing the interposing distance. For example, to increase the magnetic coupling between flywheel subassembly 200 and drive magnet 402, drive magnet 402 may be moved closer to disc 204 of flywheel subassembly 200. Similarly, moving drive magnet 402 away from disc 204 of flywheel subassembly 200 may reduce the magnetic coupling. In some example embodiments, increasing and/or decreasing the magnetic coupling between drive subassembly 400 and flywheel subassembly 200 may vary the torque associated with the drive subassembly 400. In some example embodiments, drive subassembly 400 may magnetically engage flywheel subassembly 200 without mechanically engaging flywheel subassembly 200 and/or drive subassembly 400 may operate at a rotational velocity different than flywheel subassembly 200. In some example embodiments, varying the magnetic coupling between drive magnet 402 and flywheel subassembly 200 may vary the torque exerted between drive subassembly 400 and flywheel subassembly 200.

An example magnetic drive may be used to input and/or withdraw energy from rotating flywheel subassembly 200. For example, inputting energy may include rotating drive magnet 402 at a rotational velocity greater than a rotational velocity of flywheel subassembly 200. Drive magnet 402 may be moved closer to flywheel subassembly 200 to increase the magnetic coupling. Drive magnet 402 may apply torque to flywheel subassembly 200 and/or the rotational velocity of flywheel subassembly 200 may increase. The rotational velocity of flywheel subassembly 200 may increase until it substantially equals the rotational velocity of drive magnet 402.

The present disclosure contemplates that even when the rotational velocity of flywheel subassembly 200 substantially equals the rotational velocity of drive magnet 402, the rotational velocities may not be exactly equal due slip, which may be inherent in an inductive magnetic drive.

Withdrawing energy from some example embodiments may be accomplished in a similar fashion as described above. Drive magnet 402, which may have a rotational velocity less than the rotational velocity of flywheel subassembly 200, may be moved towards flywheel subassembly 200 to increase the magnetic coupling. Flywheel subassembly 200 may exert a torque on drive subassembly 400 (via drive magnet 402), which may be transmitted to input/output device 18.

Some example embodiments may be configured to operate without a mechanical interface between flywheel subassembly 200 and other components under some operating conditions. In other words, FES device 100 may be of a free-floating flywheel design. Such a design may reduce or eliminate mechanical drag present in other FES devices that may include mechanical bearing and/or mechanical interfaces between a drive mechanism and a flywheel. In some example embodiments, active suspension (which may include mechanical bearings) may be employed when flywheel subassembly 200 is operated at rotational velocities at which the magnetic bearing does not stably support flywheel subassembly 200.

The present disclosure contemplates that the stored kinetic energy of a flywheel may be proportional to mass, proportional to radius squared, and/or proportional to the rotational velocity squared. Centripetal force may be proportional to rotational velocity squared and/or proportional to radius. Doubling a flywheel's radius may quadruple the energy stored while only doubling the centripetal force on the flywheel. In contrast, for the same flywheel, doubling the velocity may result in the same quadrupling of energy, but may also quadruple the centripetal force. Thus, doubling the flywheel radius may provide the same energy storage as a doubling of flywheel velocity, but with much lower forces within the flywheel (e.g., centripetal force).

The present disclosure contemplates that FES devices operating at relatively low rotational velocities may provide other advantages over FES devices operating at relatively high rotational velocities. For example, large, slow rotating assemblies may be more easily constructed because, in some circumstances, acceptable tolerances for slow-rotating device may be relatively large. Also, air drag may be substantially smaller for slow-rotating devices than for devices rotating at higher speeds. In some example embodiments, vortices near the edges of the flywheel may be substantially eliminated.

Some example FES devices according to the present disclosure may include very large diameter (thus using the property of energy scaling with radius squared, rather than velocity squared) and/or heavy flywheels. For example, some flywheels according to the present disclosure may be about 1 to 50 meters in diameter, about 1 to 20 meters in diameter, and/or about 5 m to 15 m in diameter. Some flywheels according to the present disclosure may have a mass of about 500 to 50,000 metric tons, about 5,000 to 15,000 metric tons, and/or about 10,000 to 35,000 metric tons. Some example embodiments may be used to store peak/excess energy output from intermittent and/or slow/trickle power sources such as wind and/or solar plants.

An example FES 100 according to the present disclosure may include a flywheel subassembly 200 including a disc 204 (e.g., see FIG. 3) with a diameter of about 40 m and/or a thickness of about 10 m. Disc 204 may include a jacket 208 (e.g., see FIG. 2) comprising a diamagnetic material, such as a copper jacket 208 about 5 cm thick. Such an example flywheel subassembly 200 may rotate at about 3600 RPM, which may have a rotational kinetic energy of about 91 megawatt hours. 91 megawatt hours of energy may last about seven years at a 2000 Watts per hour consumption rate of a U.S. household.

Some example flywheel subassemblies may be constructed from rebar-reinforced concrete, and the centripetal forces may not exceed the tensile strength of the rebar. Some example flywheel subassemblies may be constructed from other materials, such as cast iron, depleted uranium, and/or a mix of products such as one or more metals (such as aluminum, cast iron, steel) and/or one or more non-metals (such as carbon fiber, fiberglass, epoxied natural fibers like hemp). Some example flywheel subassemblies may include a housing containing inert materials like sand, earth, and/or water.

Figure 6:
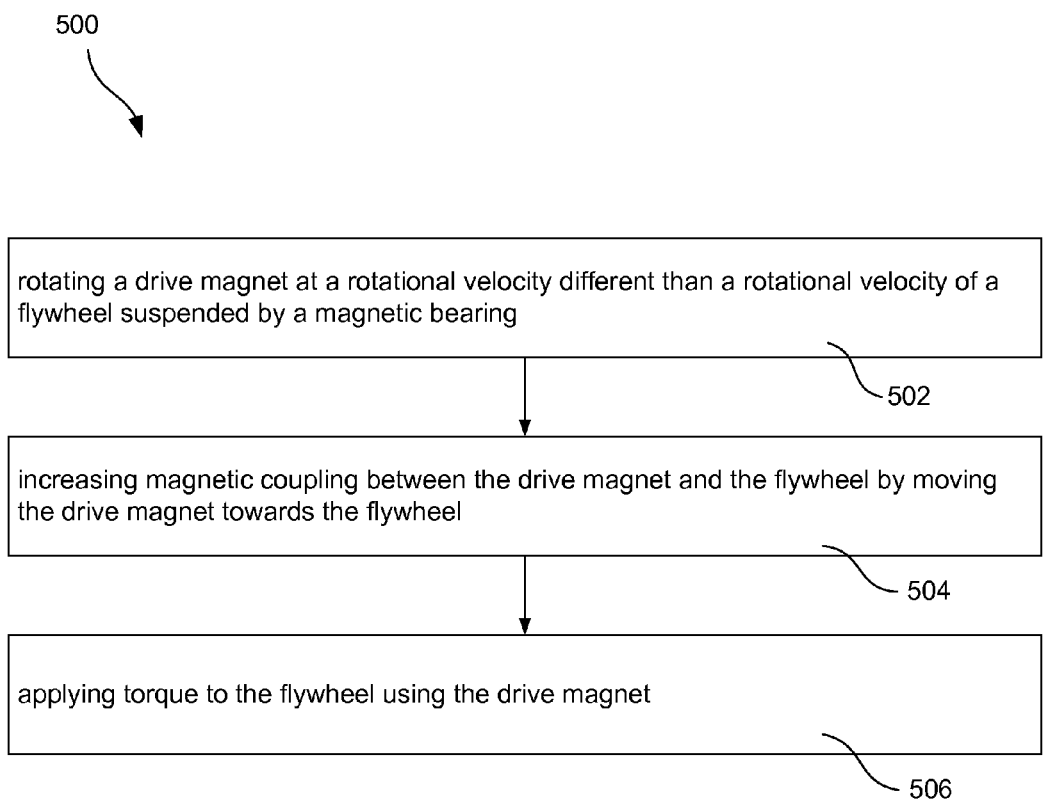
FIG. 6 is a flow chart illustrating an example method of using a flywheel energy storage device, all arranged in accordance with at least some embodiments of the present disclosure.

FIG. 6 is a flow chart illustrating an example method 500 of using a flywheel energy storage device in accordance with at least some embodiments of the present disclosure. Method 500 may include one or more operations, actions or functions as illustrated by blocks 502, 504 and/or 506. Block 502 may include rotating a drive magnet at a rotational velocity that may be different than a rotational velocity of a flywheel suspended by a magnetic bearing. Block 502 may be followed by block 504. Block 504 may include increasing magnetic coupling between the drive magnet and the flywheel by moving the drive magnet towards the flywheel. Block 504 may be followed by block 506. Block 506 may include applying torque to the flywheel using the drive magnet.

The herein described subject matter sometimes illustrates different components contained within, or coupled with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, the true scope and spirit being indicated by the following claims.

What claimed is:

1. A flywheel energy storage device comprising:
   a flywheel configured to store energy as rotational kinetic energy;
   a magnetic bearing configured to suspend the flywheel while allowing rotation of the flywheel; and
   a magnetic drive configured to selectively magnetically engage the flywheel for one or more of supplying energy to the flywheel and/or withdrawing energy from the flywheel, the magnetic drive including a rotatable drive magnet that is selectively magnetically engageable with the flywheel to affect a rotational velocity of the flywheel while the magnetic drive remains mechanically disengaged from the flywheel.

2. The flywheel energy storage device of claim 1, wherein the magnetic bearing includes a flywheel magnet mounted to the flywheel and a support magnet mounted to an enclosure; and wherein the flywheel magnet and the support magnet are configured to interact magnetically to suspend the flywheel while allowing rotation of the flywheel.

3. The flywheel energy storage device of claim 1,
   wherein the flywheel is at least partially constructed from a diamagnetic material; and
   wherein the drive magnet is configured to be repositionable with respect to the flywheel such that a strength of magnetic coupling between the drive magnet and the diamagnetic material is adjustable.

4. The flywheel energy storage device of claim 3,
   wherein the flywheel is adapted to be rotatable about a substantially vertical axis; and
   wherein the drive magnet is configured to be repositionable in a direction substantially parallel with the vertical axis.

5. The flywheel energy storage device of claim 4, wherein the drive magnet is mechanically coupled to a drive gear, the drive gear being operatively coupled to one or more of a motor and/or a generator.

6. The flywheel energy storage device of claim 1, wherein the enclosure, other than the enclosure magnet, is constructed from a substantially non-magnetic material.

7. A flywheel energy storage device comprising:
   a flywheel configured to store energy as rotational kinetic energy, the flywheel including a flywheel bearing magnet and a diamagnetic drive material;
   one or more support bearing magnets configured to magnetically interact with the flywheel bearing magnet to magnetically suspend the flywheel; and
   one or more rotatable drive magnets movably disposed relative to the flywheel to vary magnetic coupling between the drive magnet and the diamagnetic drive material such that a magnetic field in the diamagnetic drive material is induced by the operation of the drive magnet via the coupling between the drive magnet and the diamagnetic drive material.

8. The flywheel energy storage device of claim 7, wherein the flywheel and the one or more support bearing magnets are mounted within a substantially non-magnetic enclosure.

9. The flywheel energy storage device of claim 7,
   wherein the flywheel is configured to be rotatable about a substantially vertical axis; and
   wherein the drive magnet is configured to be repositionable in a direction substantially parallel with the vertical axis to vary magnetic coupling between the drive magnet and the diamagnetic drive material.

10. The flywheel energy storage device of claim 7, wherein the flywheel bearing magnet and the one or more support bearing magnets are oriented to repel each other.

11. The flywheel energy storage device of claim 7, wherein the one or more support bearing magnets comprise a ring magnet.

12. The flywheel energy storage device of claim 7, wherein the one or more rotatable drive magnets comprise a plurality of drive magnets disposed in a substantially annular arrangement.

13. The flywheel energy storage device of claim 7, wherein the one or more support bearing magnets comprise a plurality of support bearing magnets.

* * * * *